United States Patent
Wang et al.

(10) Patent No.: US 12,182,242 B2
(45) Date of Patent: Dec. 31, 2024

(54) METHOD FOR AUTHENTICATING A USER USING BIOMETRICS AND DIGITIZED HANDWRITTEN SIGNATURE, AND SYSTEM IMPLEMENTING THE SAME

(71) Applicants: William Wang, New Taipei (TW); Yu-Sung Su, New Taipei (TW)

(72) Inventors: William Wang, New Taipei (TW); Yu-Sung Su, New Taipei (TW)

( * ) Notice: Subject to any disclaimer, the term of this patent is extended or adjusted under 35 U.S.C. 154(b) by 277 days.

(21) Appl. No.: 18/050,690

(22) Filed: Oct. 28, 2022

(65) Prior Publication Data
US 2023/0141242 A1   May 11, 2023

(30) Foreign Application Priority Data
Nov. 11, 2021   (TW) .................. 110142046

(51) Int. Cl.
*G06F 21/32* (2013.01)
*G06F 3/0354* (2013.01)
*G06F 21/34* (2013.01)
*G06V 40/30* (2022.01)

(52) U.S. Cl.
CPC .......... *G06F 21/32* (2013.01); *G06F 3/03545* (2013.01); *G06F 21/34* (2013.01); *G06V 40/30* (2022.01); *H04L 2463/082* (2013.01)

(58) Field of Classification Search
CPC .......... G06F 21/32; G06F 21/31; G06F 21/34; H04L 2463/082; H04L 63/0861
See application file for complete search history.

(56) References Cited

U.S. PATENT DOCUMENTS

| | | | | |
|---|---|---|---|---|
| 6,307,956 | B1 * | 10/2001 | Black | G06Q 20/4014 713/186 |
| 7,363,505 | B2 * | 4/2008 | Black | G06Q 20/341 235/382 |
| 7,609,862 | B2 * | 10/2009 | Black | G06V 40/30 713/186 |
| 7,961,917 | B2 * | 6/2011 | Black | G06Q 20/341 382/116 |
| 9,141,955 | B2 * | 9/2015 | Mehew | G06V 40/10 |
| 9,268,928 | B2 * | 2/2016 | Lebert | G06F 21/32 |
| 9,286,457 | B2 * | 3/2016 | Beatson | H04L 9/3231 |
| 10,817,081 | B2 * | 10/2020 | Kolarov | G06F 21/64 |
| 2012/0092127 | A1 * | 4/2012 | Ganapathi | G06F 3/04144 340/5.53 |
| 2015/0286810 | A1 * | 10/2015 | Lebert | G06F 21/34 726/19 |
| 2016/0048718 | A1 * | 2/2016 | Apostolos | G06F 21/32 382/124 |

(Continued)

*Primary Examiner* — Linglan Edwards
(74) *Attorney, Agent, or Firm* — Rosenberg, Klein & Lee (57) ABSTRACT

A method for authenticating a user using biometrics and digitized handwritten signature is provided. A biometric stylus performs fingerprint recognition on the user who uses the biometric stylus to create a handwriting pattern on a handwriting input device, and transmits encrypted identification data to the handwriting input device when the fingerprint recognition is successful. The handwriting input device transmits the encrypted identification data and the handwriting pattern to a verification server. The verification server verifies the handwriting pattern, and decrypts the encrypted identification data for verifying an identity of the user when the handwriting pattern is successfully verified.

15 Claims, 5 Drawing Sheets

(56) References Cited

U.S. PATENT DOCUMENTS

2017/0323301 A1\* 11/2017 Weiss ..................... G06Q 20/20
2020/0026835 A1\* 1/2020 Mitchell ............... H04L 9/3247
2020/0117835 A1\* 4/2020 Olschowy ............... G06F 21/64

\* cited by examiner

METHOD FOR AUTHENTICATING A USER USING BIOMETRICS AND DIGITIZED HANDWRITTEN SIGNATURE, AND SYSTEM IMPLEMENTING THE SAME

CROSS-REFERENCE TO RELATED APPLICATION

This application claims priority to Taiwanese Invention Patent Application No. 110142046, filed on Nov. 11, 2021.

FIELD

The disclosure relates to a digital signature system, and more particularly to a method and a system for authenticating a user using biometrics and digitized handwritten signature.

BACKGROUND

With the advancement of technology, digitized handwritten signatures (handwritten signatures that are inputted electronically) have become a common means for customer identification in the banking industry and for merchants to confirm customer signatures. In order to obtain a signature electronically, usually, a touch pad or signature capture pad is provided for a customer to sign with a stylus, and then the signature handwriting or the signature screen on the touch pad is captured for signature authentication. In addition, some e-commerce companies or banks may require digitized signature authentication when customers log in to their e-commerce websites or bank websites to conduct business at home. In such a scenario, customers may use a stylus to sign on their own computer devices, and an operating system of the e-commerce company or bank is permitted to obtain the customer's digitized signature for identity authentication.

However, since the signature handwriting can be imitated and digitized signature files can be forged by other means and uploaded for verification, the industry is unable to confirm whether the person who provides the signature is the real owner of the signature, and it is difficult for customers to prevent their digitized signature from being imitated by others to create forged signatures for transactions.

SUMMARY

Therefore, an object of the disclosure is to provide a method and a system for authenticating a user using biometrics and digitized handwritten signature. The method can alleviate at least one of the drawbacks of the prior art.

According to some embodiments of the disclosure, the method includes a first procedure that is associated with fingerprint verification, a second procedure that is associated with handwriting input, and a third procedure that is associated with user identification. The first procedure includes a step of, by a biometric stylus that stores a piece of encrypted identification data and a fingerprint template of the user therein and that is capable of fingerprint recognition, generating a piece of first verification data that includes the encrypted identification data when determining that a fingerprint captured by the biometric stylus matches the fingerprint template of the user. The encrypted identification data is related to an identity of the user. The second procedure includes a step of, by a handwriting input device, receiving the first verification data from the biometric stylus, a step of, the handwriting input device, acquiring a handwriting pattern that is inputted on the handwriting input device through touch sensing using the biometric stylus, and a step the handwriting input device, generating a piece of second verification data that is encrypted and that includes the encrypted identification data and the handwriting pattern. The third procedure includes a step of, by a verification server, receiving the second verification data from the handwriting input device, a step of, by the verification server, decrypting the second verification data to obtain the encrypted identification data and the handwriting pattern, and a step of, by the verification server, decrypting the encrypted identification data to obtain a piece of user identification data for verifying the identity of the user when determining at least that the handwriting pattern matches a handwriting template of a piece of personal identification data stored in the verification server.

According to some embodiments of the disclosure, the method includes a first procedure that is associated with fingerprint verification, a second procedure that is associated with handwriting input, and a third procedure that is associated with user identification. The first procedure includes a step of, by a biometric stylus that stores a piece of encrypted identification data and a fingerprint template of the user therein and that is capable of fingerprint recognition, encrypting the encrypted identification data to generate a piece of first verification data when determining that a fingerprint captured by the biometric stylus matches the fingerprint template of the user. The encrypted identification data is related to an identity of the user. The second procedure includes a step of, by a handwriting input device, receiving the first verification data from the biometric stylus, and decrypting the first verification data to obtain the encrypted identification data; a step of, by the handwriting input device, acquiring a handwriting pattern that is inputted on the handwriting input device through touch sensing using the biometric stylus; and a step of, by the handwriting input device, encrypting the encrypted identification data and the handwriting pattern to generate a piece of second verification data. The third procedure includes steps of, by a verification server, receiving the second verification data from the handwriting input device, and decrypting the second verification data to obtain the encrypted identification data and the handwriting pattern; and a step of, by the verification server, decrypting the encrypted identification data to obtain a piece of user identification data for verifying the identity of the user when determining at least that the handwriting pattern matches a handwriting template of a piece of personal identification data stored in the verification server.

According to the disclosure, the system includes a biometric stylus that is capable of fingerprint recognition, a handwriting input device and a verification server that cooperate to perform the method of the present disclosure.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 through 5, a first embodiment of a method for authenticating a user using biometrics and digitized handwritten signature according to this disclosure is adapted to be realized in an authentication system by means of electric circuits, firmware and/or software programs, and is adapted for a user to perform identity verification in online financial transactions or online shopping transactions, and/or for a user to perform identity verification in transactions at brick-and-mortar stores or banks. The authentication system includes a biometric stylus 3, a handwriting input device 4 and a verification server 5 that cooperate to perform the method.

Figure 1:
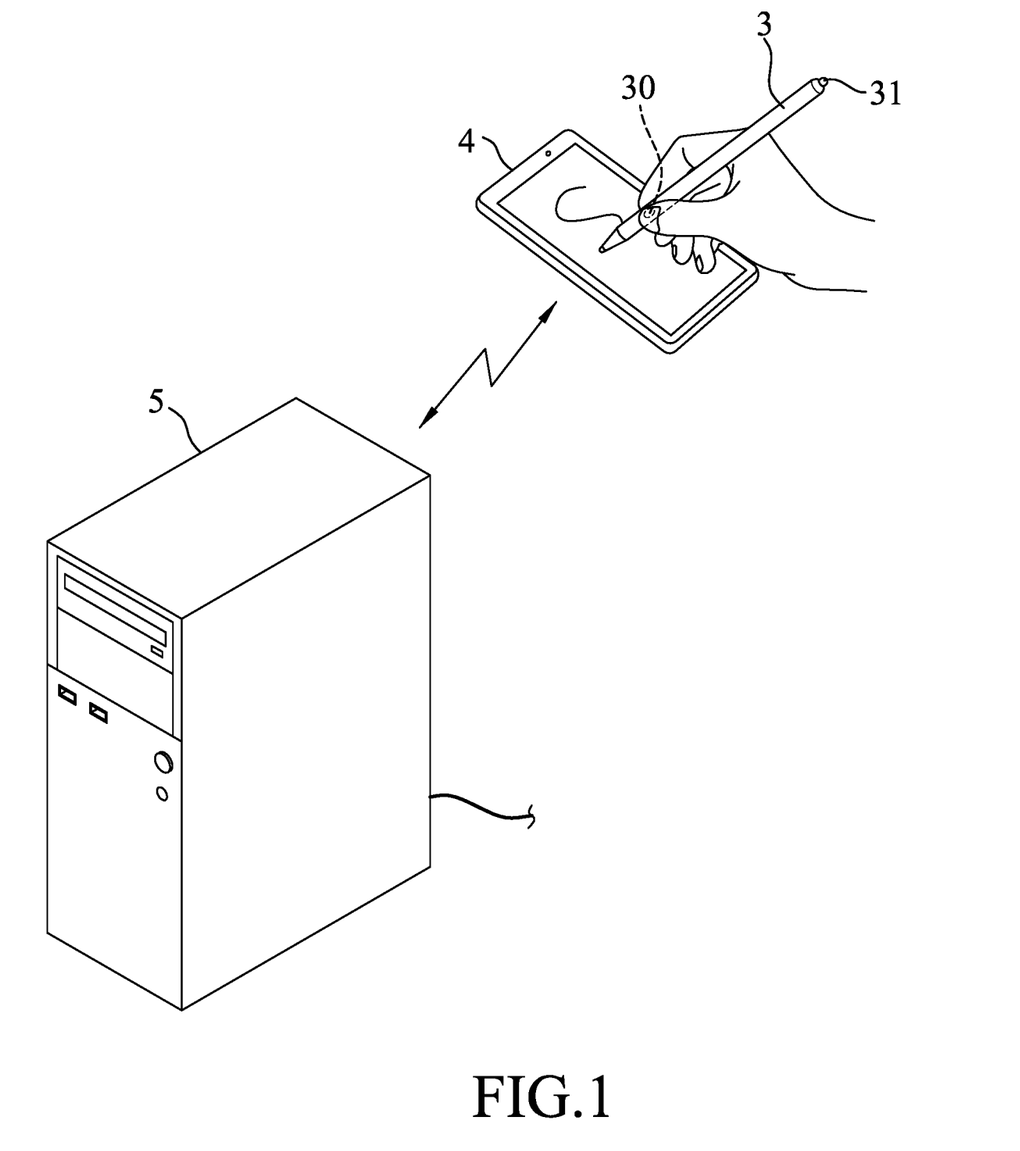
FIG. 1 is a schematic diagram illustrating an embodiment of an authentication system according to the disclosure.

The biometric stylus 3 is owned by the user and is capable of fingerprint recognition. The biometric stylus 3 includes a fingerprint sensor 30 to sense a fingerprint of the user, and a memory unit (e.g., flash memory, not shown) storing a fingerprint template of the user that is pre-established by the user and a piece of encrypted identification data that is related to an identity of the user. Further, the biometric stylus 3 may include a microcontroller to perform matching between a fingerprint captured by the fingerprint sensor (hereinafter referred to as the "captured fingerprint") and the fingerprint template and to perform data encryption, and is configured to communicate with the handwriting input device 4 through wired and/or wireless communication, so as to perform data transmission with the handwriting input device 4.

The handwriting input device 4 may be owned either by the user or by a bank or a merchant, and is configured for touch operation, so the biometric stylus 3 can be used to perform writing on the handwriting input device 4 through touch sensing. The handwriting input device 4 may be realized as, for example, a smartphone, a tablet computer, a notebook computer, etc., but this disclosure is not limited to such. The handwriting input device 4 is configured to communicate with the verification server 5 through wired and/or wireless communication, so as to perform data transmission with the verification server 5.

The verification server 5 may be, for example but not limited to, a transaction server for an online banking system or an online shopping platform, and is configured to directly perform identity verification for the user when the user intends to log in to the transaction server for making a transaction. In some embodiments, the verification server 5 may be a third-party verification server that is configured to, when the user logs in to a transaction server of the online banking system or the online shopping platform for making a transaction, assist the transaction server to perform identity verification for the user. In some embodiments, the verification server 5 may be a third-party verification server that is configured to assist a brick-and-mortar store or bank in verifying the identity of the user when the user performs a transaction at the brick-and-mortar store or bank. The verification server 5 stores a piece of personal identification data of the user that may be established through a user registration procedure. The personal identification data may include, for example but not limited to, a handwriting template that corresponds to a handwritten signature of the user, a piece of registered identity information (e.g., a serial number of an identification card, a phone number, a membership number, etc.) of the user, or any other information that can be used for identity verification. The verification server 5 may store multiple pieces of personal identification data (e.g., each including a corresponding handwriting template) relating to multiple different users. Moreover, the verification server 5 may also store multiple handwriting templates for a same user.

The aforesaid wireless communication may include but not limited to any conventional network technology and/or mobile communication technology, such as Bluetooth, the fourth/fifth generation of mobile phone mobile communication technology standards (4G/5G), etc., and this disclosure is not limited to such.

Figure 2:
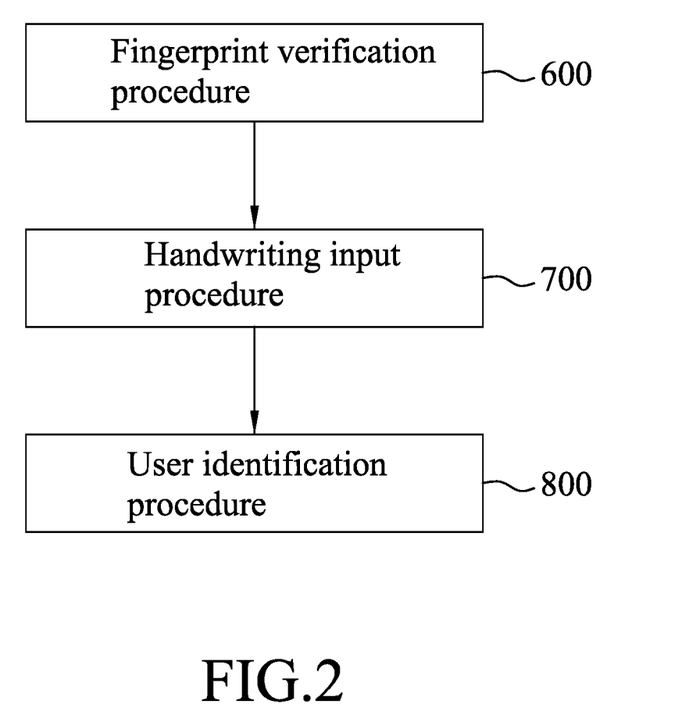
FIG. 2 is a flow chart illustrating procedures of embodiments of a method for authenticating a user with a biometric signature according to the disclosure.

The first embodiment of the method for authenticating a user using biometrics and digitized handwritten signature according to this disclosure includes a fingerprint verification procedure 600, a handwriting input procedure 700, and a user identification procedure 800. These procedures enable the verification server 5 to verify the identity of the user.

Figure 3:
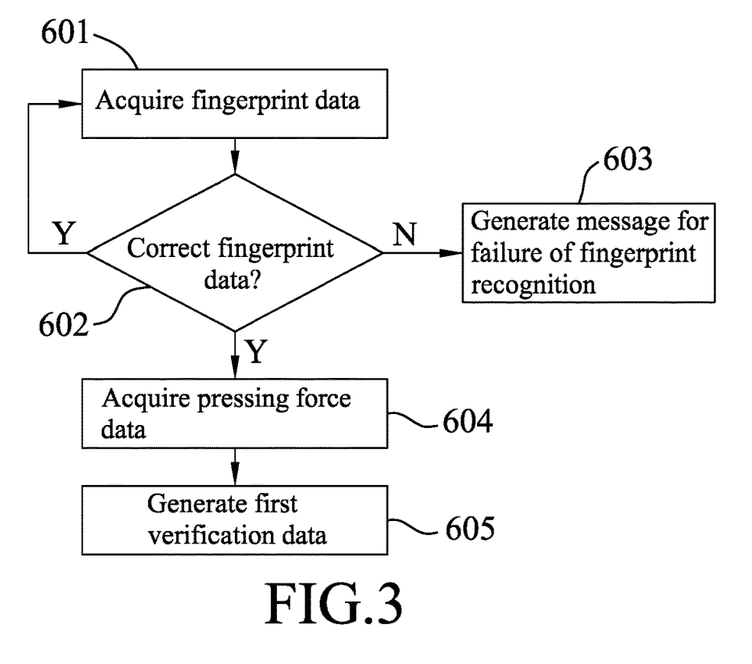
FIG. 3 is a flow chart illustrating steps of a fingerprint verification procedure of a first embodiment of the method according to the disclosure.

Referring to FIGS. 1, 2 and 3, the fingerprint verification procedure 600 includes steps 601 through 605.

In step 601, the user may hold the biometric stylus 3 with a to-be-sensed finger being in contact with the fingerprint sensor 30, so that the fingerprint sensor 30 senses or scans a fingerprint of the user to obtain a piece of fingerprint data, and then the flow goes to step 602.

In step 602, the biometric stylus 3 may use conventional techniques to analyze and acquire feature points of the fingerprint data. The conventional techniques may include, for example but not limited to, image processing such as fingerprint area detection, image enhancement, image binarization, image thinning, etc., extraction of fingerprint patterns and detailed features, etc. Then, the biometric stylus 3 determines whether the feature points of the fingerprint data match the fingerprint template of the user that is stored in the biometric stylus 3. When the determination is negative, which means that the captured fingerprint does not match the fingerprint template of the user (i.e., the fingerprint data is incorrect), the flow goes to step 603, where the biometric stylus 3 generates an indication message that indicates mismatching in fingerprint recognition. When the determination is affirmative (i.e., the fingerprint data is correct), which means that the captured fingerprint matches the fingerprint template of the user, the flow goes to step 604 and then step 605.

In step 604, the biometric stylus 3 generates an indication message that indicates successful fingerprint verification, and activates a function of pressing force sensing to sense a pressing force on a tip of the biometric stylus 3 (e.g., using a force sensor disposed in the biometric stylus 3) when, for example, the biometric stylus 3 is used to abut against an object (e.g., the handwriting input device 4) with the tip thereof to perform writing on the object, so as to generate a piece of pressing force data. The pressing force data records writing strokes during a pressing period in which the biometric stylus 3 is used to write (e.g., perform a handwriting operation on the handwriting input device 4 via touch sensing), and may include, for example but not limited to, a record of variations of the pressing force applied to the tip of the biometric stylus 3 for each writing stroke during the pressing period, and a pressing time record that contains time points respectively of a beginning and an end of the record of variations of the pressing force for each writing stroke (i.e., starting time and end time of the writing stroke). In this embodiment, the biometric stylus 3 determines initiation and completion of a writing stroke based on continuous abutment of the tip that starts from a time point the tip of the biometric stylus 3 starts to be abutted against and that ends at a time point the tip of the biometric stylus 3 is released from abutment.

In this embodiment, the user may press a control button 31 of the biometric stylus 3 when completing the handwriting operation, so as to control the biometric stylus 3 to end acquisition of the pressing force data. In one embodiment, the biometric stylus 3 may determine that the handwriting operation is done and end acquisition of the pressing force data when the tip has not been pressed for over a predetermined length of time (e.g., several seconds, such as two or three seconds) after a successful matching between the captured fingerprint and the fingerprint template. In one embodiment, the biometric stylus 3 may determine that the handwriting operation is done and end acquisition of the pressing force data when the fingerprint sensor 30 has not captured the fingerprint of the user for over a predetermined length of time (for example but not limited to, 0.3 or 0.5 seconds) after a successful matching between the captured fingerprint and the fingerprint template.

In step 605, after the acquisition of the pressing force data ends, the biometric stylus 3 encrypts the encrypted identification data and the pressing force data to generate a piece of first verification data, and transmits the first verification data to the handwriting input device 4.

In practice, after determining a successful matching of the captured fingerprint in step 602, the biometric stylus 3 may, in addition to performing step 604, re-perform step 601 periodically (e.g., every 0.3 or 0.5 seconds), followed by determining whether the newly captured fingerprint still matches the fingerprint template. Once determining that the newly captured fingerprint does not match the fingerprint template, the function of pressing force sensing may be immediately disabled, and step 603 is performed.

Figure 4:
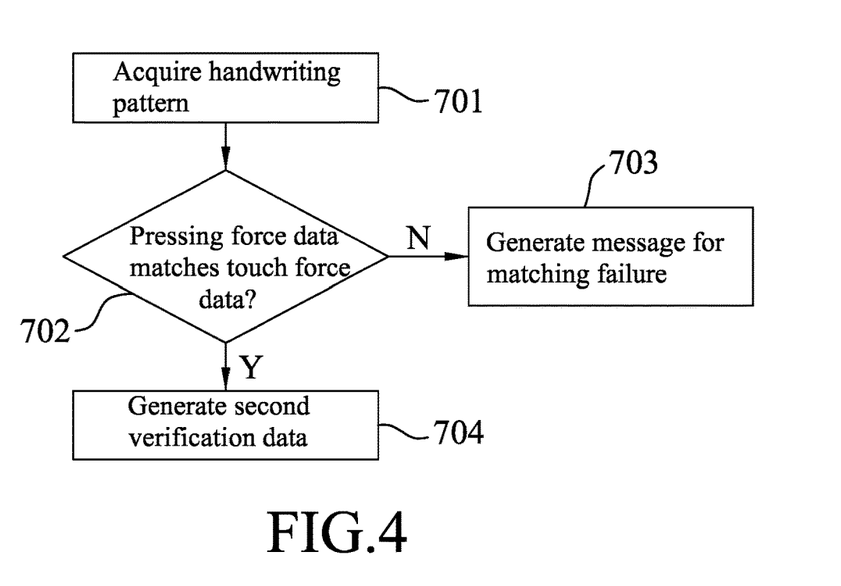
FIG. 4 is a flow chart illustrating steps of a handwriting input procedure of the first embodiment.

Referring to FIGS. 1, 2 and 4, the handwriting input procedure 700 includes steps 701 through 704.

In step 701, the handwriting input device 4 acquires a handwriting pattern that corresponds to a plurality of touch points on the handwriting input device 4 and that represents a handwriting of the user as inputted via the handwriting input device 4, and a piece of touch force data of the touch points during a touch input period in which a handwriting operation is performed on the handwriting input device 4. The touch force data records writing strokes during the touch input period, and includes, for each writing stroke, a record of variations of the touch forces applied to those of the touch points that correspond to the writing stroke (those of the touch points that are touched as the writing stroke is touch-inputted on the handwriting input device 4), and a touch time record that contains time points respectively of a beginning and an end of the record of variations of the touch forces (i.e., starting time and end time of the writing stroke). In this embodiment, the handwriting input device 4 determines initiation and completion of a writing stroke based on continuous touching on a touch screen or a touch pad (not shown) thereof that starts from a time point touching begins to be sensed by the touch screen or the touch pad to a time point the touch screen or the touch pad no longer senses the touching. During actual implementation, step 604 of the fingerprint verification procedure 600 and step 701 of the handwriting input procedure 700 may be performed simultaneously as the user performs a handwriting operation on the handwriting input device 4 using the biometric stylus 3. The handwriting input device 4 may end step 701 when the touch screen or the touch pad has not been touched for over a predetermined length of time of, for example but not limited to, several seconds (e.g., two or three seconds), and the flow goes to step 702.

In step 702, the handwriting input device 4 decrypts the first verification data to obtain the encrypted identification data and the pressing force data, and determines whether the pressing force data matches the touch force data. For example, the handwriting input device 4 may compare the writing strokes as recorded by the pressing force data with the writing strokes as recorded by the touch force data one by one, following an order of sequence of the writing strokes (namely, with respect to each writing stroke of the writing operation, the handwriting input device 4 compares the corresponding pressing force data with the corresponding touch force data). When making comparison with respect to each writing stroke, the handwriting input device 4 may determine whether the pressing time record for the writing stroke matches the touch time record for the writing stroke, and whether the record of variations of the pressing force for the writing stroke matches the record of variations of the touch forces for the writing stroke.

Upon determining that the pressing time record does not match the touch time record or that the record of variations of the pressing force does not match the record of variations of the touch forces, which means that the handwriting pattern is not created using the biometric stylus 3, the flow goes to step 703, where the handwriting input device 4 generates an indication message that indicates mismatching between the touch force data and the pressing force data in a form of, for example but not limited to, sound, lighting effect, image(s), and/or text.

Upon determining that the pressing time record matches the touch time record and that the record of variations of the pressing force matches the record of variations of the touch forces, which means that the handwriting pattern was created using the biometric stylus 3, the flow goes to step 704.

In step 704, the handwriting input device 4 encrypts the encrypted identification data and the handwriting pattern to generate a piece of second verification data, and transmits the second verification data to the verification server 5.

Figure 5:
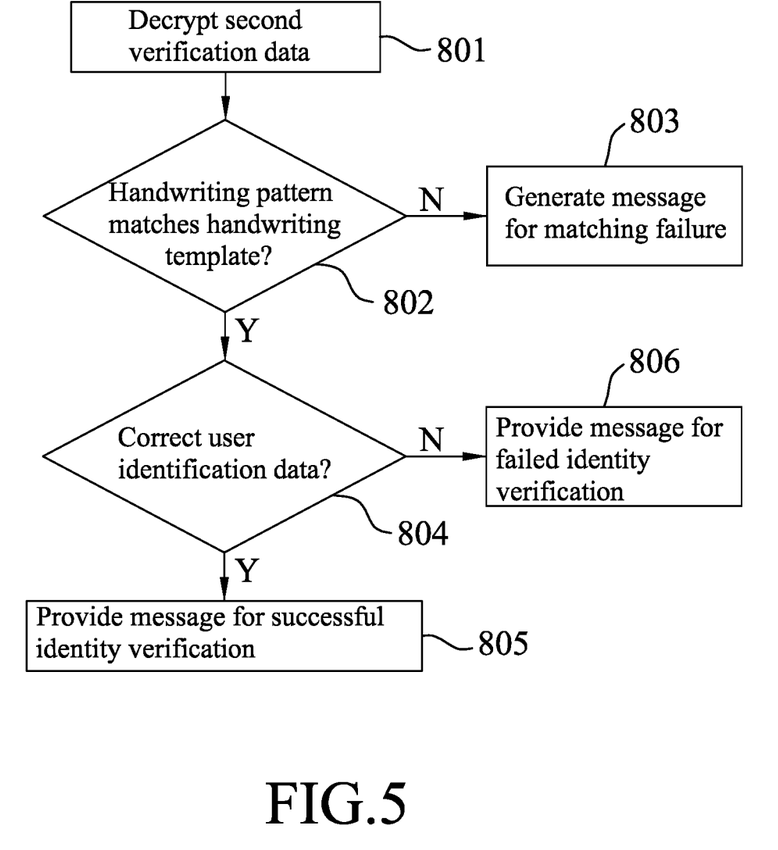
FIG. 5 is a flow chart illustrating steps of a user identification procedure of the first embodiment.

Referring to FIGS. 1, 2 and 5, the user identification procedure 800 includes steps 801 through 806.

In step 801, the verification server 5 decrypts the second verification data to obtain the encrypted identification data and the handwriting pattern, and the flow goes to step 802.

In step 802, the verification server 5 may use conventional handwriting comparison techniques to analyze and compare the handwriting pattern with multiple handwriting templates that are stored in the verification server 5, and determines whether the handwriting pattern matches one of the handwriting templates. The handwriting comparison techniques may include, for example but not limited to, overlapping comparison, geometric comparison, etc. When the verification server 5 determines that the handwriting pattern does not match any one of the handwriting templates (i.e., the handwriting pattern is incorrect), the authentication of the handwriting pattern fails, and the flow goes to step 803, where the verification server 5 generates and transmits an indication message that indicates a matching failure to the handwriting input device 4. When the verification server 5 determines that the handwriting pattern matches one of the handwriting templates (i.e., the handwriting pattern is correct), the flow goes to step 804.

In step 804, the verification server 5 acquires the personal identification data that includes the matched one of the handwriting templates, and decrypts the encrypted identification data to obtain a piece of user identification data for verifying the identity of the user. The verification server 5 compares the user identification data with the registered identity information of the personal identification data. Upon determining that the user identification data matches the registered identity information of the personal identification data, the flow goes to step 805. Upon determining that the user identification data does not match the registered identity information of the personal identification data, the flow goes to step 806. The user identification data may include, for example but not limited to, a serial number of an identification card, a phone number, a member identification number, etc., of the user, but this disclosure is not limited in this respect.

In step 805, when the verification server 5 is a transaction server of an online banking system, an online shopping platform, a brick-and-mortar bank or a brick-and-mortar store, the verification server 5 may generate and transmit an indication message that indicates successful identity verification to the handwriting input device 4 for notifying the user that the identity verification has been successfully completed, and the verification server 5 continues to complete a desired transaction operation. When the verification server 5 is a third-party verification server, the verification server 5 may generate and transmit an indication message that indicates successful identity verification to the handwriting input device 4 and a transaction server of the online banking system, the online shopping platform, the brick-and-mortar bank or the brick-and-mortar store, for notifying the user that the identity verification has been successfully completed, and for making the transaction server continue to complete a desired transaction operation. Examples of the desired transaction operation may include but not limited to, financial transfer, product ordering, payment operation, and so on.

In step 806, the verification server 5 transmits an indication message that indicates failed identity verification to the handwriting input device 4 and/or the transaction server, so as to terminate the transaction operation.

Through the abovementioned embodiment, when the user intends to perform a transaction through an online banking system or shopping platform, he or she has to use his/her own biometric stylus 3 to sign on the handwriting input device 4 that is communicatively connected to the verification server 5 for identity verification. Similarly, when the user intends to perform a transaction in a brick-and-mortar store or bank, the user may communicatively connect his/her own biometric stylus 3 to the handwriting input device 4 of the store or bank, and then use the biometric stylus 3 to sign on the handwriting input device 4 for identity verification. In the abovementioned embodiment, the biometric stylus 3 verifies the fingerprint of the user, the handwriting input device 4 verifies the writing strokes, the verification server 5 verifies the handwriting pattern, and the user identification data is provided after the aforesaid verifications are all successful. Such a flow can significantly enhance accuracy of identity verification and security of transactions.

Referring to FIGS. 1, 2, 6 and 7, a second embodiment of a method for authenticating a user using biometrics and digitized handwritten signature according to this disclosure is provided. The second embodiment is similar to the first embodiment, and differs from the first embodiment in the handwriting input procedure 700 and the user identification procedure 800.

Figure 6:
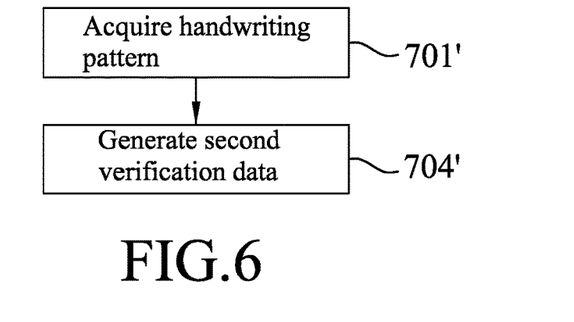
FIG. 6 is a flow chart illustrating steps of a handwriting input procedure of a second embodiment of the method according to the disclosure.

The handwriting input procedure 700 of the second embodiment includes steps 701' and 704'. In step 701', the handwriting input device 4 obtains the handwriting pattern and the touch force data through touch sensing. In step 704', the handwriting input device 4 encrypts the first verification data, the handwriting pattern and the touch force data to generate a piece of second verification data, and transmits the second verification data to the verification server 5.

Figure 7:
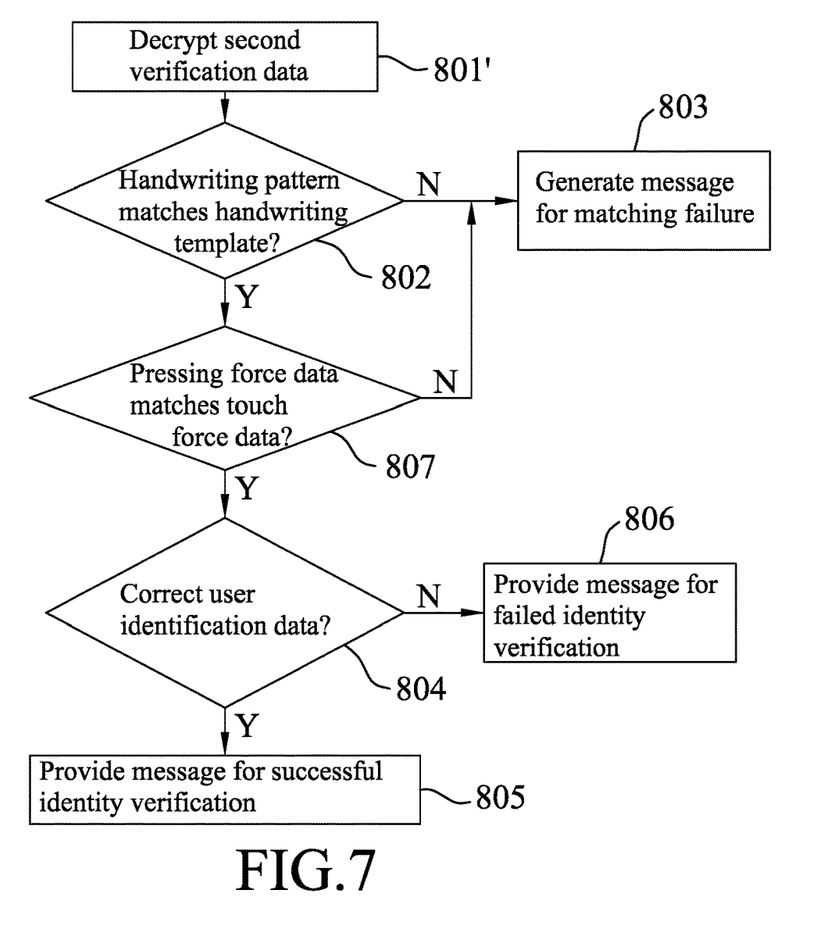
FIG. 7 is a flow chart illustrating steps of a user identification procedure of the second embodiment.

The user identification procedure 800 of the second embodiment includes steps 801' through 807. In step 801' of the second embodiment, the verification sever 5 decrypts the second verification data to obtain the first verification data, the handwriting pattern and the touch force data. Step 807 is performed when the verification server 5 determines in step 802 that the handwriting pattern matches one of the handwriting templates stored therein.

In step 807, the verification server 5 decrypts the first verification data to obtain the encrypted identification data and the pressing force data, and compares the pressing force data with the touch force data. Upon determining that the pressing force data matches the touch force data, the flow goes to step 804. Otherwise, the flow goes to step 803.

The first and second embodiments compare not only the handwriting pattern with the handwriting templates, but also the pressing force data with the touch force data. In some embodiments, the comparison between the pressing force data and the touch force data may be omitted, and the acquisitions of the pressing force data and the touch force data are thus not required. The combination of the verifications of the fingerprint and the handwriting pattern can promote the accuracy of identity verification and the security of transactions.

In the first and second embodiments, the first verification data is generated by the biometric stylus 3 encrypting the encrypted identification data and the pressing force data in step 605. In some embodiments, the biometric stylus 3 may directly make a collection of the encrypted identification data and the pressing force data serve as the first verification data without further encryption, so the handwriting input device 4 and the verification server 5 can directly obtain the encrypted identification data and the pressing force data from the first verification data in the handwriting input procedure 700 and the user identification procedure 800, without the need to decrypt the first verification data.

In summary, through the authentication system that implements the method for authenticating a user using biometrics and digitized handwritten signature, when a user intends to perform an online transaction through an online banking system or shopping platform, or to perform a transaction in a brick-and-mortar bank or store and needs identity verification, the security of the transaction can be ensured by not only the verification of the handwriting pattern but also the fingerprint verification. Further, the comparison between the pressing force data and the touch force data can ensure that the handwriting pattern is performed by the user using his/her own biometric stylus 3, so the problems of using counterfeits of signatures and a handwriting pattern that is illegally acquired or imitated to perform the transaction can be effectively prevented.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for authenticating a user using biometrics and digitized handwritten signature, comprising:
    a first procedure that is associated with fingerprint verification, and that includes a step of, by a biometric stylus that stores an encrypted identification data and a fingerprint template of the user therein and that performs fingerprint recognition, generating a first verification data that includes the encrypted identification data when determining that a fingerprint captured by the biometric stylus matches the fingerprint template of the user, wherein the encrypted identification data is related to an identity of the user;
    a second procedure that is associated with handwriting input, and that includes steps of
        by a handwriting input device, receiving the first verification data from the biometric stylus,
        by the handwriting input device, acquiring a handwriting pattern that is inputted on the handwriting input device through touch sensing using the biometric stylus, and
        by the handwriting input device, generating a second verification data that is encrypted and that includes the encrypted identification data and the handwriting pattern; and
    a third procedure that is associated with user identification and that includes steps of
        by a verification server, receiving the second verification data from the handwriting input device,
        by the verification server, decrypting the second verification data to obtain the encrypted identification data and the handwriting pattern, and
        by the verification server, decrypting the encrypted identification data to obtain a user identification data for verifying the identity of the user when determining at least that the handwriting pattern matches a handwriting template of a personal identification data stored in the verification server.

2. The method of claim 1, wherein the first procedure further includes a step of:
    by the biometric stylus, sensing a pressing force on a tip thereof during a pressing period in which the tip is pressed to generate a pressing force data upon determining that the fingerprint captured by the biometric stylus matches the fingerprint template of the user;
    wherein the step of generating the first verification data in the first procedure is performed by encrypting the encrypted identification data and the pressing force data;
    wherein the handwriting pattern corresponds to a plurality of touch points on the handwriting input device, and the second procedure further includes a step of:
    by the handwriting input device, sensing touch forces applied to the touch points as the handwriting pattern is being inputted on the handwriting input device to generate a touch force data;
    wherein the step of generating a second verification data in the second procedure is performed by encrypting the first verification data, the handwriting pattern and the touch force data; and
    wherein in the third procedure,
        the step of decrypting the second verification data is to obtain the first verification data, the handwriting pattern and the touch force data, and
        the step of decrypting the encrypted identification data includes sub-steps of:
            by the verification server, decrypting the first verification data to obtain the encrypted identification data and the pressing force data upon determining that the handwriting pattern matches the handwriting template; and
            by the verification server, decrypting the encrypted identification data to obtain the user identification data upon determining that the pressing force data matches the touch force data.

3. The method of claim 2, wherein the pressing force data includes a record of variations of the pressing force applied to the tip of the biometric stylus during the pressing period in which the biometric stylus is used to perform writing on an object such that the tip of the biometric stylus abuts against the object;
    wherein the touch force data includes a record of variations of the touch forces applied to the touch points on the handwriting input device during a touch input period in which the handwriting pattern is being inputted on the handwriting input device; and
    wherein, in the third procedure, the verification server determines whether the pressing force data matches the touch force data by determining whether the record of variations of the pressing force matches the record of variations of the touch forces.

4. The method of claim 3, wherein the pressing force data further includes a pressing time record that contains time points respectively of a beginning and an end of the record of variations of the pressing force;

wherein the touch force data further includes a touch time record that contains time points respectively of a beginning and an end of the record of variations of the touch forces; and wherein, in the third procedure, the verification server determines whether the pressing force data matches the touch force data further by determining whether the pressing time record matches the touch time record.

5. The method of claim 4, wherein the third procedure includes a step of, by the verification server, generating a message indicating that the identity of the user is successfully verified upon determining that the user identification data matches a registered identity information of the personal identification data.

6. The method of claim 1, wherein the third procedure includes a step of, by the verification server, generating a message indicating that the identity of the user is successfully verified upon determining that the user identification data matches a registered identity information of the personal identification data.

7. The method of claim 1, wherein the first procedure includes a step of by the biometric stylus, sensing a pressing force on a tip thereof during a pressing period in which the tip is pressed to generate a pressing force data upon determining that the fingerprint captured by the biometric stylus matches the fingerprint template of the user;

wherein the step of generating the first verification data in the first procedure includes generating the first verification data to include the encrypted identification data and the pressing force data;

wherein the handwriting pattern corresponds to a plurality of touch points on the handwriting input device, and the second procedure includes steps of:

by the handwriting input device, sensing touch forces applied to the touch points as the handwriting pattern is being inputted on the handwriting input device to generate a touch force data; and by the handwriting input device, obtaining the encrypted identification data and the pressing force data from the first verification data; and wherein the step of generating a second verification data in the second procedure is performed by encrypting the encrypted identification data and the handwriting pattern upon determining that the pressing force data matches the touch force data.

8. A system for authenticating a user using biometrics and digitized handwritten signature, comprising a biometric stylus that performs fingerprint recognition, a handwriting input device and a verification server, wherein the biometric stylus, the handwriting input device and the verification server cooperate to perform the method of claim 1.

9. A method for authenticating a user using biometrics and digitized handwritten signature, comprising:

a first procedure that is associated with fingerprint verification, and that includes a step of, by a biometric stylus that stores an encrypted identification data and a fingerprint template of the user therein and that performs fingerprint recognition, encrypting the encrypted identification data to generate a first verification data when determining that a fingerprint captured by the biometric stylus matches the fingerprint template of the user, wherein the encrypted identification data is related to an identity of the user;

a second procedure that is associated with handwriting input, and that includes steps of:

by a handwriting input device, receiving the first verification data from the biometric stylus, and decrypting the first verification data to obtain the encrypted identification data;

by the handwriting input device, acquiring a handwriting pattern that is inputted on the handwriting input device through touch sensing using the biometric stylus; and by the handwriting input device, encrypting the encrypted identification data and the handwriting pattern to generate a second verification data; and a third procedure that is associated with user identification and that includes steps of:

by a verification server, receiving the second verification data from the handwriting input device, and decrypting the second verification data to obtain the encrypted identification data and the handwriting pattern; and by the verification server, decrypting the encrypted identification data to obtain a user identification data for verifying the identity of the user when determining at least that the handwriting pattern matches a handwriting template of a personal identification data stored in the verification server.

10. The method of claim 9, wherein the first procedure includes a step of:

by the biometric stylus, sensing a pressing force on a tip thereof during a pressing period in which the tip is pressed to generate a pressing force data upon determining that the fingerprint captured by the biometric stylus matches the fingerprint template of the user;

wherein the step of encrypting the encrypted identification data to generate a first verification data in the first procedure includes encrypting the encrypted identification data and the pressing force data to generate the first verification data;

wherein the handwriting pattern corresponds to a plurality of touch points on the handwriting input device, and the second procedure includes steps of:

by the handwriting input device, decrypting the first verification data to obtain the encrypted identification data and the pressing force data; and by the handwriting input device, sensing touch forces applied to the touch points as the handwriting pattern is being inputted on the handwriting input device to generate a touch force data; and wherein the step of encrypting the encrypted identification data and the handwriting pattern to generate the second verification data in the second procedure is performed upon determining that the pressing force data matches the touch force data.

11. The method of claim 10, wherein the pressing force data includes a record of variations of the pressing force applied to the tip of the biometric stylus during the pressing period in which the biometric stylus is used to perform writing on an object such that the tip of the biometric stylus abuts against the object;

wherein the touch force data includes a record of variations of the touch forces applied to the touch points on the handwriting input device during a touch input period in which the handwriting pattern is being inputted on the handwriting input device; and wherein, in the second procedure, the handwriting input device determines whether the pressing force data matches the touch force data by determining whether the record of variations of the pressing force matches the record of variations of the touch forces.

12. The method of claim 11, wherein the pressing force data further includes a pressing time record that contains time points respectively of a beginning and an end of the record of variations of the pressing force;
- wherein the touch force data further includes a touch time record that contains time points respectively of a beginning and an end of the record of variations of the touch forces; and
- wherein, in the second procedure, the handwriting input device determines whether the pressing force data matches the touch force data further by determining whether the pressing time record matches the touch time record.

13. The method of claim 12, wherein the third procedure includes a step of, by the verification server, generating a message indicating that the identity of the user is successfully verified upon determining that the user identification data matches a registered identity information of the personal identification data.

14. The method of claim 9, wherein the third procedure includes a step of, by the verification server, generating a message indicating that the identity of the user is successfully verified upon determining that the user identification data matches a registered identity information of the personal identification data.

15. A system for authenticating a user using biometrics and digitized handwritten signature, comprising a biometric stylus that performs fingerprint recognition, a handwriting input device and a verification server, wherein the biometric stylus, the handwriting input device and the verification server cooperate to perform the method of claim 9.

* * * * *